March 20, 1928.
H. M. KATZ
1,663,051
FENDER
Filed Aug. 9, 1927
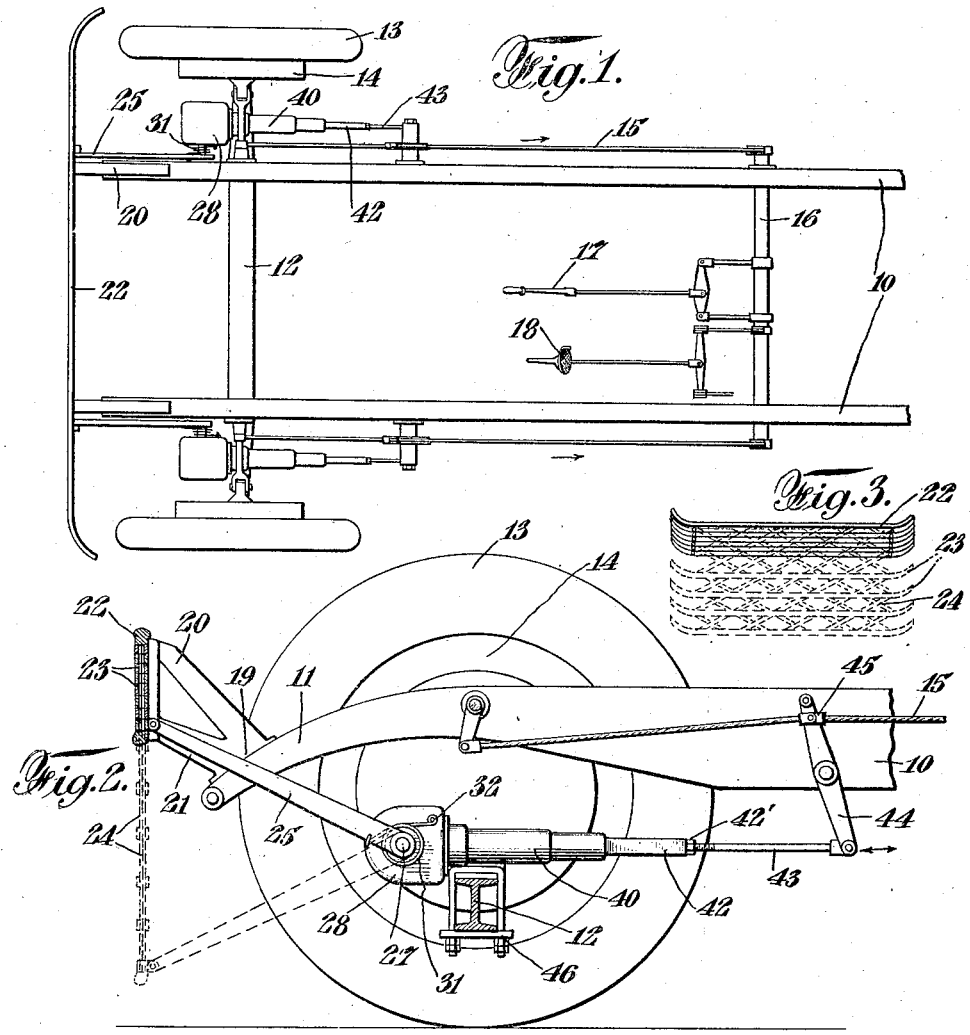
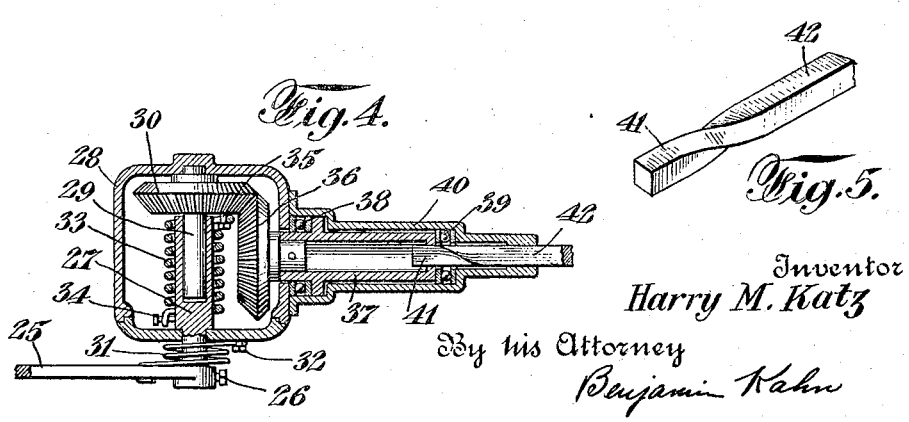
Inventor
Harry M. Katz
By his Attorney
Benjamin Kahn Patented Mar. 20, 1928.

1,663,051

UNITED STATES PATENT OFFICE.

HARRY M. KATZ, OF NEW YORK, N. Y.

FENDER.

Application filed August 9, 1927. Serial No. 211,673.

This invention relates to fenders, bumpers and safety devices, with particular reference to such as are fixed to the front of conventional motor vehicles.

The fenders, which are used at present, are frequently of petty protection should the motor vehicle to which it is fixed accidentally strike a pedestrian, since it is of rigid-bar construction that, upon striking persons or objects, merely hurls them to the ground, permitting the possibility of their being crushed under the wheels of the vehicle.

It is therefore the object of the present invention to provide a combined fender and safety device connected to and operated automatically by the brakes of a motor vehicle and which, when the brakes are applied, forms a flexible screen in advance of the vehicle, protecting pedestrians from being injured by the wheels.

A further feature is in the provision of means adapted to return the safety device to its normal position after the brakes have been released.

These objects, together with others which will become apparent as the description progresses, are attained by the construction, combination, and arrangement of elements hereinafter described and illustrated in the associated illustration, comprising a material component of this disclosure, and in which:

Figure 1 is a top plan view of the forward portion of a motor vehicle equipped with a brake at each wheel and a combined safety device made in accordance with this invention, the body of the vehicle being removed to show the structure.

Figure 2 is an enlarged, fragmentary, side elevational view of a part of the same.

Figure 3 is a reduced, perspective view of a combined bumper and safety device in detail.

Figure 4 is a longitudinal sectional view taken through the center line of the safety device actuating means.

Figure 5 is a fragmentary perspective view of a structural detail.

The numeral 10 generally designates the side members of a conventional vehicle chassis having downwardly bowed front portions 11, to which is fixed the usual front axle 12 carrying forward wheels 13 on the inside of which are brake housings 14 containing any conventional braking mechanisms (not shown) actuated by cables 15 fixed to lever arms mounted on a rod 16, journalled in the side frame members 10 and actuated by either the usual emergency hand lever 17 or foot pedal 18.

Rigidly secured on the upper surface of the chassis frame members, at the forward ends 11 are brackets 19 having forwardly extending spaced arms 20 and 21, relatively upper and lower, the upper arm carrying a bar 22, its rearwardly curved ends reaching in front of the forward wheels 13.

Connected to the bar 22 and extending therebelow are a plurality of flat rods 23 connected by lazy-tongs elements 24, the lowermost rod having pivotally connected at its ends, levers 25 adjustably fixed by set screws 26 on the outer ends of sleeves 27 journalled in casings 28.

Revoluble in the inner ends of the sleeves and bearings in the casings are short studs 29 carrying bevel gears 30. Coiled about the outer extending portions of the sleeves 27 are torsion springs 31, their ends engaging respectively the levers 25 and studs 32 secured in the adjacent walls of the casings 28.

Coiled about the sleeves 27, within the casings, are similar but stronger torsion springs 33, one of the ends of which engage studs 34 fixed in the solid portion of the sleeves and the other ends engaging studs 35 fixed in the faces of the bevel gears 30.

The gears 30 mesh with mating gears 36, the hubs of which are secured in flanged sleeves 37 rotatably mounted on anti-friction bearings 38 and 39 set in the opposite ends of elongated cylindrical casings 40, the outer ends of the sleeves 37 having openings receptive of the helical portion 41 of bars 42 of rectangular cross section adjustably connected through lock nuts 42', with rods 43 pivoted to rocker arms 44 rotatably mounted on the side frame members 10, the opposite ends of the arms 44 being provided with clips 45 to adjustably engage the cables 15 which pass through them, and by which motion is transmitted to the arms and bars 42.

If more convenient the cables may be directly attached to the rods 43, in which case the action of the bars 43 will be reversed, and it will be obvious that the bars 43, instead of being of rectangular cross-section may be cylindrical and provided with a helical key.

The casings 40 are fixed to the axle 12 by brackets 46 or any other similar fastening means.

Thus, should an emergency arise and either the hand lever 17 or the foot pedal 18 be actuated, the rod 16 will be rotated, moving the cables 15 in the direction of the arrows shown in Figure 1 to actuate the brakes housed in the casings 14.

The movement of the cables 15 will also, through their connection with the rocker-arms 44, cause the bars 42 to slide in the casings 40, causing the sleeves 37 to be rotated by the helical portions 41 of the bars 43, which action, through the spring 33, will move the levers 25 downwardly, opening the safety device as shown in broken lines in Figures 2 and 3, forming a screen in advance of the motor vehicle extending from side to side around the wheels and from their normal position nearly to the ground.

It will be noted that the bevel gears 30 do not directly actuate the levers 25 but through the intermediary of the torsion elements.

When either of the brakes 17 or 18 is released the cables 15 will move forwardly automatically retracting the bars 42 to permit the torsion springs 33 to return the levers 25 to their normal upward positions, closing the safety device, as shown in full lines in Figure 3.

It will be noted that after the bars 42 have entered the sleeves 37 beyond their helical portions, the screen will, because of the shape of the bars, remain open until the retraction of the helical portions.

While the foregoing is descriptive of the preferred embodiment of my invention it is not intended that the same be interpreted in a limitative sense as obviously changes may be made without the exercise of invention or departing from the spirit and scope of the claims hereto appended.

Having thus described my invention what I claim as new and desire to secure by Letters Patent, is:—

1. A safety fender for vehicles comprising in combination with the brakes of a motor vehicle, a plurality of fender bars carried by the chassis of the vehicle, lazy-tongs connections between said bars, and means connected to the lowermost of said bars actuated by the application of the vehicle brakes to operate said bars and lazy-tongs forming a protecting screen.

2. A safety fender for vehicles comprising in combination with the brakes of a motor vehicle, a plurality of fender bars the uppermost being rigidly mounted at the front of the vehicle, lazy-tongs connections intermediate said bars, a pair of levers pivotally connected to the lowermost of said bumper bars, rocker arms having one end connected to the brakes of the vehicle, and means connected intermediate the other ends of said arms and said levers to distend said bars and lazy-tongs to form a protecting screen.

3. A safety fender for vehicles comprising in combination with the brakes of a vehicle, a plurality of fender bars on the front of the vehicle, lazy-tongs intermediate said bars, a casing fixed on the axle of the vehicle, a sleeve rotatably mounted in said casing, connections intermediate said sleeve and the lowermost of said bars, and means operable in said sleeve actuated by the brakes to rotate said sleeve to lower said bars forming a protecting screen.

4. An automatic safety fender for vehicles comprising in combination with the brakes of a vehicle, a casing fixed to the front axle of the vehicle, a flanged sleeve rotatably mounted therein, a second sleeve journalled in said casing, connections intermediate said sleeves, a lever fixed to the second sleeve, a screen operatively connected to said lever, and means engaging said flanged sleeve and connected to the brakes to rotate the same whereby to extend said screen.

5. An automatic safety device for vehicles comprising in combination with the brakes of a vehicle, a screen mounted on the front of the vehicle, an arm pivotally connected thereto, a casing, a bar connected to the brakes of the vehicle slidable in said casing, said bar having a helical portion, and means actuated by said helical portion to operate said lever whereby the screen is extended.

6. An automatic safety device for vehicles comprising in combination with the brakes of a vehicle, a screen mounted on the front of the vehicle, an arm pivotally connected thereto, a casing, a bar slidable in said casing, said bar having a helical portion, adjustable connections between said bar and the brakes of the vehicle, and means actuated by said helical portion to operate said lever whereby the screen is extended and held firmly in extended position.

7. A fender for vehicles comprising forwardly and upwardly extending brackets secured to the chassis frame bars at their forward extremities, a bar fixed in the upper part of said brackets to extend across the front of the vehicle, a series of bars having extensible connections with each other and with said fixed bar, pivoted levers engaging the lowermost bar in said series, and means carried by said vehicle for manipulating said levers.

8. A fender for vehicles comprising a series of parallel bars arranged horizontally in a vertical plane at the front of a vehicle, means for rigidly supporting the upper bar, extensible connections between all of said bars, pivoted levers attached to the lower bar, geared connections to operate the pivots of said levers, and means in the vehicle to actuate said geared connections.

9. A fender for vehicles comprising a series of parallel bars arranged horizontally in a vertical plane at the front of a vehicle, means for rigidly supporting the upper bar, extensible connections between all of said bars, levers pivotally attached to the lower bar of said series, pivots on which said levers are fixed, geared connections on said pivots, torsional springs interposed between said geared connections and pivots, and means in the vehicle to manually operate said geared connections.

In testimony whereof I affix my signature.

HARRY M. KATZ.